(12) United States Patent
Furusawa

(10) Patent No.: US 9,067,709 B2
(45) Date of Patent: Jun. 30, 2015

(54) SYNTHETIC RESIN DOUBLE CONTAINER MOLDED BY DIRECT BLOW MOLDING PROCESS

(75) Inventor: Mitsuo Furusawa, Osaka (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 290 days.

(21) Appl. No.: 12/452,272

(22) PCT Filed: Jun. 19, 2008

(86) PCT No.: PCT/JP2008/061189
§ 371 (c)(1),
(2), (4) Date: Feb. 25, 2010

(87) PCT Pub. No.: WO2009/004927
PCT Pub. Date: Jan. 8, 2009

(65) Prior Publication Data
US 2010/0200586 A1    Aug. 12, 2010

(30) Foreign Application Priority Data

Jun. 29, 2007 (JP) .................................. 2007-172672

(51) Int. Cl.
*B65D 1/02*    (2006.01)
*B65D 23/02*   (2006.01)
(Continued)

(52) U.S. Cl.
CPC ................ *B65D 23/02* (2013.01); *B29C 49/04* (2013.01); *B29C 49/22* (2013.01); *B29C 49/4817* (2013.01); *B29K 2023/12* (2013.01); *B29K 2067/00* (2013.01); *B29L 2009/001* (2013.01);
(Continued)

(58) Field of Classification Search
CPC   B29C 49/22; B29L 2009/001; B65D 1/0215; B65D 23/02
USPC .............. 220/62.22, 675; 215/12.1, 379, 381
See application file for complete search history.

(56) References Cited

U.S. PATENT DOCUMENTS 4,071,597 A * 1/1978 Karabedian .................... 264/230
4,182,457 A * 1/1980 Yamada et al. ............... 428/36.6
(Continued)

FOREIGN PATENT DOCUMENTS

| AT | AU 2008272244 B2 | 6/2008 |
|---|---|---|
| JP | A-57-151314 | 9/1982 |

(Continued)

OTHER PUBLICATIONS

Machine translation of JP 2005-212392 A.*
(Continued)

*Primary Examiner* — Fenn Mathew
*Assistant Examiner* — Christopher McKinley
(74) *Attorney, Agent, or Firm* — Oliff PLC

(57) ABSTRACT

The technical problems of this invention are to overcome a limitation in the aspect of the shape of conventional synthetic resin double containers comprising an inner container and an outer container and to solve a problem of additional steps required to assemble the outer and inner containers. A principle means taken to solve these problems comprises a double container made by a direct blow molding process wherein a space is formed between the outer layer and the inner layer made of synthetic resins that are mutually non-adherent, thus allowing both layers to be left in a detached state due to a difference in mold shrinkage factors between the two layers during the direct blow molding step.

4 Claims, 4 Drawing Sheets

(51) Int. Cl.
  *B29C 49/22*  (2006.01)
  *B29C 49/48*  (2006.01)
  *B32B 7/06*  (2006.01)
  *B32B 27/32*  (2006.01)
  *B32B 27/36*  (2006.01)
  *B29C 49/04*  (2006.01)
  *B29K 23/00*  (2006.01)
  *B29K 67/00*  (2006.01)
  *B29L 9/00*  (2006.01)

(52) U.S. Cl.
  CPC . *B32B 7/06* (2013.01); *B32B 27/32* (2013.01); *B32B 27/36* (2013.01); *B65D 1/0215* (2013.01)

(56) References Cited

U.S. PATENT DOCUMENTS

| | | | | |
|---|---|---|---|---|
| 4,261,473 | A | * | 4/1981 | Yamada et al. ............... 215/379 |
| 4,463,861 | A | * | 8/1984 | Tsubone et al. ............. 215/12.2 |
| 4,816,305 | A | * | 3/1989 | Stillwell et al. ............. 428/35.7 |
| 5,799,809 | A | * | 9/1998 | Sako et al. ................... 215/12.1 |
| 6,039,204 | A | * | 3/2000 | Hosokoshiyama et al. .. 220/623 |
| 6,413,600 | B1 | * | 7/2002 | Slat ............................... 428/35.7 |
| 6,461,699 | B1 | * | 10/2002 | Slat et al. ..................... 428/35.7 |
| 6,749,780 | B2 | * | 6/2004 | Tobias ....................... 264/37.31 |
| 7,614,515 | B2 | * | 11/2009 | Furusawa et al. ............. 215/373 |
| 7,770,762 | B2 | * | 8/2010 | Arghyris et al. ........... 222/386.5 |
| 2004/0069735 | A1 | * | 4/2004 | Yoneyama et al. .......... 215/12.1 |
| 2005/0155981 | A1 | * | 7/2005 | Abe et al. ....................... 222/105 |

FOREIGN PATENT DOCUMENTS

| | | |
|---|---|---|
| JP | A-9-286084 | 11/1997 |
| JP | A-2002-36344 | 2/2002 |
| JP | A-2004-352327 | 12/2004 |
| JP | 2005212392 A * | 8/2005 |

OTHER PUBLICATIONS

Sep. 30, 2008 Search Report issued in International Application No. PCT/JP2008/061189 (with translation).

Jan. 26, 2010 Office Action issued in International Application No. PCT/JP2008/061189 (with translation).

Dec. 22, 2011 Annex to the Communication issued in EP 08 765 744.1.

Jan. 2, 2013 Office Action issued in EP 08 765 744.1.

Granted Claim according to the Jan. 2, 2013 Office Action in EP 08 765 744.1.

* cited by examiner

SYNTHETIC RESIN DOUBLE CONTAINER MOLDED BY DIRECT BLOW MOLDING PROCESS

TECHNICAL FIELD

This invention relates to a synthetic resin double container having a space formed between an outer layer and an inner layer by a direct blow molding process.

BACKGROUND ART

Patent Document 1 describes an invention of a double container comprising a cylindrical outer container and an inner container wherein upper portions of the outer and inner container are fixed each other with a fitting cap. Such double containers are in use as a heat insulating container utilizing the double walls, or in the field of cosmetics containers, as a decorative container having a transparent outer container in which an inner container looks afloat.
[Patent Document 1] Published patent application JP2004-352327

DISCLOSURE OF THE INVENTION

Technical Problems to be Solved by the Invention

The double container described in Patent Document 1 is formed by inserting the inner container into the outer container and fitting the cap around the outer container in an undercut engagement. Because of the need to insert the inner container into the outer container, the neck is required to have a large bore diameter, and this is a limitation from the aspect of its shape. Furthermore, there is a problem of additional positions, parts, or steps for assembling the outer and inner containers.

This invention has been made to solve these problems associated with double container. The technical problem of this invention is thus to create a synthetic resin double container that can be molded in simple steps without any limitation from the aspect of shape.

Means of Solving the Problems

A principal means of this invention to solve the above technical problem comprises a double container made by a direct blow molding process wherein a space is formed between the outer layer and the inner layer made of synthetic resins that are mutually non-adherent, thus allowing both layers to be left in a detached state due to a difference in mold shrinkage factors between the two layers revealed in a direct blow molding step, wherein the inner layer has a larger mold shrinkage factor than the outer layer, and the outer and inner layers have low adherent strength so that the peeling force acting on the interface would be sufficiently larger than the adherent strength.

The inventors of this application molded a multi-layered parison having an outer layer and an inner layer laminated to each other by a multi-layer extrusion molding process, and studied a direct blow molding process for direct blow molding the multi-layered parison in the molten state. They have found that a space is formed by combining synthetic resins to be used as the outer and inner layers so that the two layers would be peeled from each other due to mold shrinkage after the container has been released from the mold. This finding has led them to make this invention.

The double container having the space between the outer and inner layers can be molded by utilizing the difference in mold shrinkage factors of the outer and inner layers in an ordinary direct blow molding process, without requiring any additional steps of inserting the inner container into the outer container and firmly fitting the former to the latter.

A basic requirement for the outer layer and the inner layer to be peeled from each other due to the mold shrinkage occurring in the direct blow molding process is that the inner layer has a larger mold shrinkage factor than the outer layer has. On the other hand, both layers are in a closely attached condition right after the blow molding even though both layers are non-adherent to each other. Therefore, another principal requirement for both layers to be peeled from each other is that the closely attached outer and inner layers have low adherent strength.

Due to the difference in the mold shrinkage factors, the peeling force acts on the interface between the outer layer and the inner layer. The synthetic resins used respectively in the outer and inner layers and the blow molding conditions are selected so that this peeling force becomes larger than the adherent strength of both layers. In this way, a space can be formed effectively between the outer layer and the inner layer, due to the mold shrinkage involved in the direct blow molding.

Furthermore, the synthetic resin selected for the outer layer or the inner layer is not only used independently as the main component, but also can be blended with, e.g., an elastomer, or the main component may have a pigment, a filler, etc., dispersed therein. The blends with, or dispersion of, other components can also be of help in increasing the mold shrinkage for the inner layer and decreasing the strength of close contact between the outer and inner layers, thus making it possible to proceed with the separation of both layers smoothly. The inner layer may also comprise two adhesively laminated layers having different mold shrinkage factors. In this case, the inner layer can be deformed flexibly in a bimetallic manner so as to be peeled from the outer layer.

From the aspect of molding conditions, a large difference in the mold shrinkage factors between both layers can be obtained by a parison molding temperature or a blow air temperature that gives differences in the cooling speed or in the behavior of expansion in the blow molding of the outer and inner layers.

If the double wall is utilized as a means of heat insulation, it is preferred that the space between outer and inner layers is formed over an almost entire area of the container except for the neck. Or both layers can be partially peeled for any purpose. For instance, the container can be decorated with both of peeled portions and closely contacted portions according to a certain pattern.

In the case of a bottle-like container having a neck, this neck of the bottle remains in the same shape as the preform neck since the neck undergoes little deformation during the blow molding. The outer and inner layers can be fitted to each other firmly at this neck.

Another means of this invention comprises that, in addition to the above basic construction, an outer layer portion of a bottom seal has a cracked pinch-off portion in a bottom, wherein the bottom seal is formed in an underside surface of a bottom by a pinch-off section of a split blow mold, and wherein the cracked pinch-off portion in the bottom is formed by the action of mold shrinkage involved in the direct blow molding process.

The bottom seal is a portion where large pressing force is applied by the mold pinch-off section. Therefore, the bottom seal has large residual strain, and tends to deform due to mold shrinkage involved in the direct blow molding. Since the outer and inner layers are non-adherent to each other, the cracked pinch-off portion can be easily formed in the outer layer portion as it is peeled partially from the inner layer.

The formation of the cracked pinch-off portion takes place roughly at the same time with the development of the peeling force that acts on the interface between the outer layer and the inner layer as a result of mold shrinkage. Peeling starts from the cracked pinch-off portion, and the separation of the outer layer from the inner layer propagates smoothly all over the container, and the space between both layers can be formed easily, thus allowing the cracked pinch-off portion to serve as an air intake port to let the air in this space.

Still another means of carrying out this invention comprises that the inner layer forms an inner container which is deformable in an inwardly deflating manner with the drop of inner pressure.

The above construction is concerned with a peelably laminated container or a so-called delaminatable container, in which the inner container is formed by the inner layer made of a flexible synthetic resin and molded to have a thin wall. When the contents are discharged under this construction, the inner layer peels from the outer layer, and the inner container deflates and falls in a decompressed state. Even if the remaining amount gets low, the contents can be discharged smoothly.

The delaminatable container is molded by first molding a laminated parison by a multi-layer extrusion molding process and then blow molding the laminated parison. Under the blow molded condition, the outer and inner layers are laminated in an adherent state. Before the container is filled with contents, the inner layer is usually suctioned from inside by means of some vacuum equipment to put the inside of the inner container reduced pressure, so that the inner layer is peeled from the outer layer over a roughly entire area of the container. Then, before the container is used, pressurized air is applied to the inner container to let the inner container restore the shape resembling that of the outer container made of the outer layer.

Thus, under the above construction, a space is formed between the outer and inner layers due to the mold shrinkage involved in the direct blow molding process. Therefore, this invention eliminates the above-described additional steps of peeling the inner layer from the outer layer.

Effects of the Invention

This invention having the above construction has the following effects:

The double container having a space between the outer layer and the inner layer, which constitutes the main construction of this invention, has no need of inserting the inner container into the outer container and fixing the outer container and the inner container each other. The double container of this invention can be molded easily by utilizing the difference in mold shrinkage factors between the outer layer and the inner layer in an ordinary direct blow molding process.

In the case of a container having a cracked pinch-off portion in the outer layer portion of the bottom seal, the cracked pinch-off portion is formed roughly at the same time with the development of the peeling force that acts on the interface between the outer layer and the inner layer as a result of mold shrinkage. Peeling starts from the cracked pinch-off portion, and the separation of the inner layer from the outer layer propagates smoothly all over the container, and the space between both layers can be formed easily.

In the case of a container in which the inner layer forms an inner container which is deformable in a deflating manner inwardly with the drop of inner pressure, this invention is concerned with a so-called delaminatable container. Since the space is formed by peeling the inner layer from the outer layer due to the mold shrinkage involved in the direct blow molding process, this invention eliminates the additional step of separating the inner layer tentatively from the outer layer, which has been required in the production of conventional delaminatable containers.

DESCRIPTION OF REFERENCE SIGNS

Figure 1:
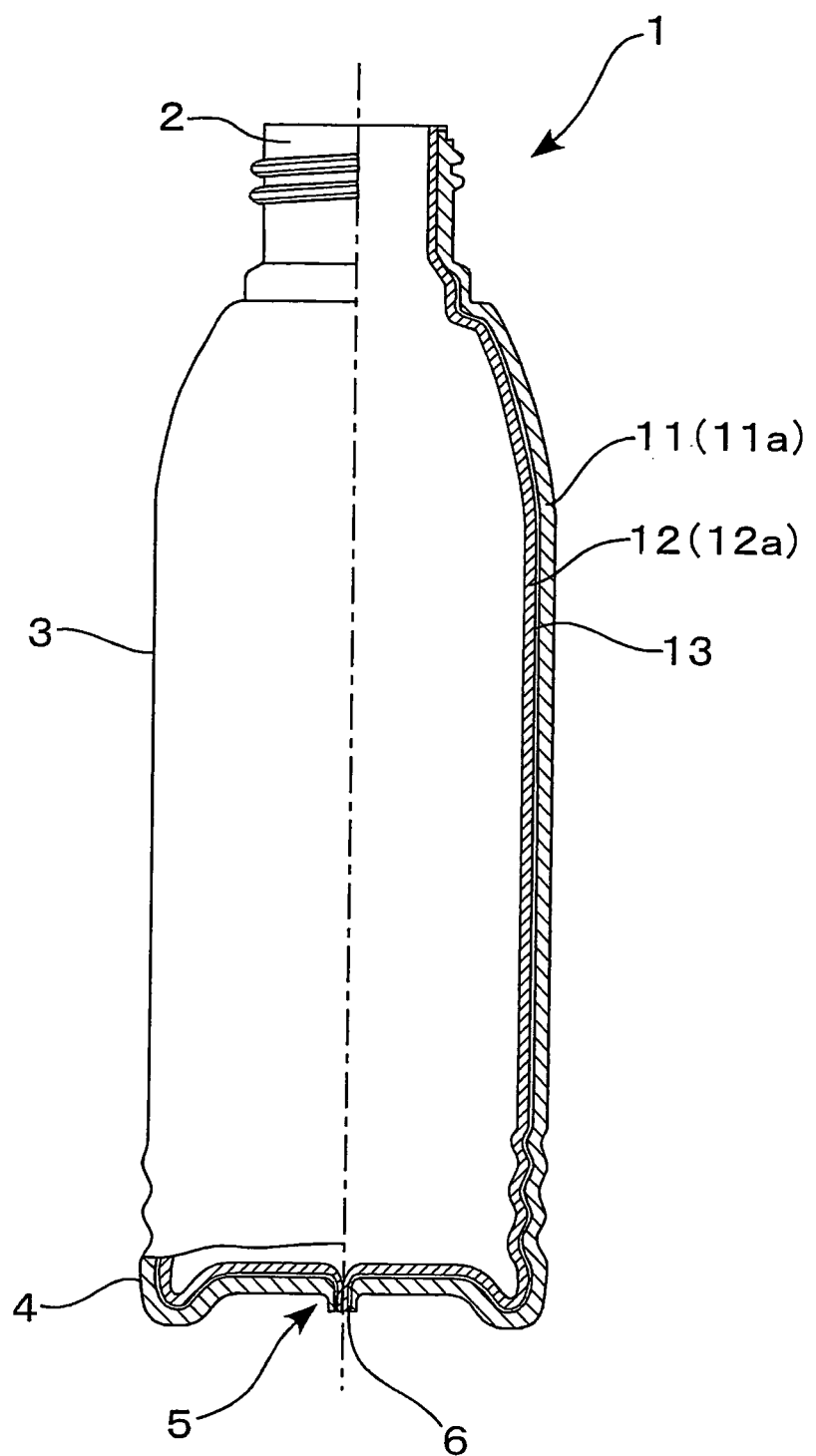
FIG. 1 is a front view, partially shown in a vertical section, of the double container in the first embodiment of this invention.

1. Double container
1a. Container
2. Neck
3. Body
4. Bottom
5. Bottom seal
5a. Pin-driven cavity
6. Cracked pinch-off portion
11. Outer layer
11a. Outer container
12. Inner layer
12a. Inner container
13. Space
20. Container with a comb attachment
21. Cap
22. First check valve
23. O-ring
25. Comb attachment
26. Discharge flow passage
26a. Discharge port
27. Tooth
31. Base cup
32. Second check valve
P. Pump

PREFERRED EMBODIMENTS

This invention is further described with respect to preferred embodiments, now referring to the drawings. FIG. 1 is a front view, partially shown in a vertical section, of the double container in the first embodiment of this invention. This double container is molded by a direct blow molding process, and is a bottle having a neck 2, a cylindrical body 3, and a bottom 4.

This double container 1 comprises an outer container 11a made from an outer layer 11 of a polyethylene terephthalate (PET) resin and an inner container 12a made from an inner layer 12 of a polypropylene (PP) resin. A space 13 is formed between the outer layer 11 and the inner layer 12 over an area ranging from right under the neck 2 to the bottom 5, and thus, the double container 1 has a double-wall structure in which the space 13 is sandwiched between both layers.

The process for molding the double container 1 of FIG. 1 is described below. First, mutually non-adherent outer and inner layers are laminated by a multi-layer extrusion molding process to form a multi-layered parison. Then, the double container 1 can be molded by blow molding this multi-layered parison in a molten state, according to the direct blow molding process.

As soon as the blow molded product is released from the mold, the overall mold shrinkage of the product begins and goes on. A bottom seal 5 in the bottom 4 is formed when the parison is pressed and cut by a great deal of power of the mold pinch-off section. Therefore, the bottom seal 5 has especially large residual strain. In addition, since the bottom seal 5 is a relatively thick wall portion, the outer layer 11 is partially peeled from the inner layer 12 with the progress of the mold shrinkage, as shown in FIG. 1. A cracked pinch-off portion 6 is thus formed in the bottom portion of the outer layer 11.

In the meantime, if an outer layer 11 made of a PET resin and an inner layer 12 made of a PP resin are used as in this embodiment so that the inner layer 12 has a larger mold shrinkage factor than the outer layer 11 has, then with the progress of mold shrinkage, the peeling force to separate layers acts on the interface between the outer layer 11 and the inner layer 12. Starting from the cracked pinch-off portion 6, where the outer layer 11 and the inner layer 12 have been partially peeled from each other, and taking in outside air through the cracked pinch-off portion 6, the separation of layers propagates all over the container due to the action of this peeling force. As shown in FIG. 1, the space 13 is formed in portions other than the neck 2, and the double-wall structure is completed with the space 13 being sandwiched by the outer and inner layers.

The separation of layers does not occur at the neck 2, and both the outer and inner layers remain adherent after the mold shrinkage has taken place, because the neck 2 does not deform largely at the time of blow molding.

Figure 2:
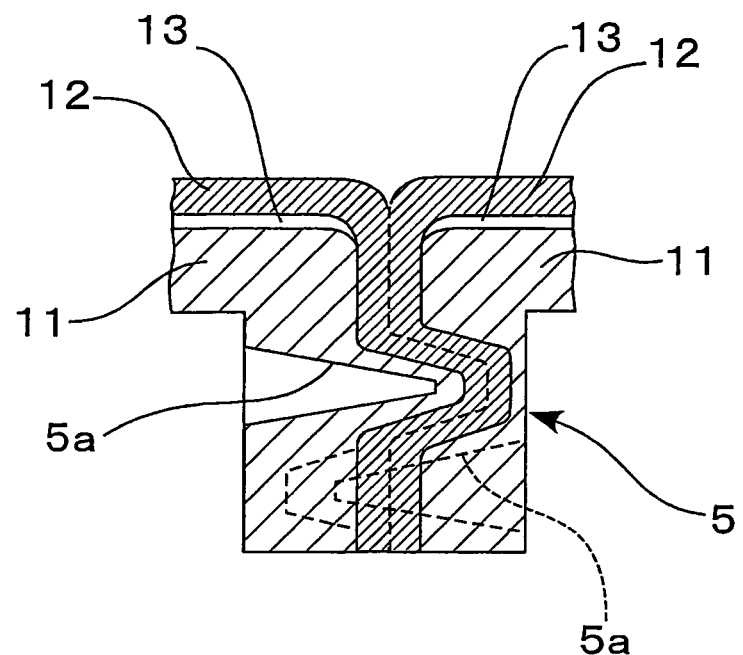
FIG. 2 is a vertical section showing another example of the bottom seal.

FIG. 2 shows another embodiment of the bottom seal 5 that prevents the pinch-off portion structurally from being cracked. In this embodiment, the bottom seal 5 is in the shape of a ridge having a height and width so that adherent outer layer 11 and inner layer 12 in the bottom seal 5 would have a large area. The ridge-like bottom seal 5 is also provided with multiple pin-driven cavities 5a, which increase not only the area of adherent outer and inner layers, but also dramatically increase resistance to shear energy acting in the direction parallel to the plane of close contact. Owing to this construction, the bottom seal 5 has high mechanical strength and no crack in the pinch-off portion.

If such a bottom seal 5 is adopted, the bottom seal 5 cannot be used as the starting point for the above-described peeling. However, even in such a case, the separation of the inner layer 12 from the outer layer 11 can be made to start and go on, and a nearly vacuum space 13 can be formed, by selecting a sufficiently large mold shrinkage factor for the inner layer 12 than for the outer layer 11 to lower the strength of adherence between the outer layer 11 and the inner layer 12.

In other words, the synthetic resin materials used for the outer layer 11 and the inner layer 12, the blow molding conditions and wall thickness of the outer layer 11 and the inner layer 12 are selected so that the peeling force acting on the interface would be sufficiently larger than the adherent strength of the layers.

It is preferable to thickening the wall of the outer layer 11 and the inner layer 12 for easy peeling.

Figure 3:
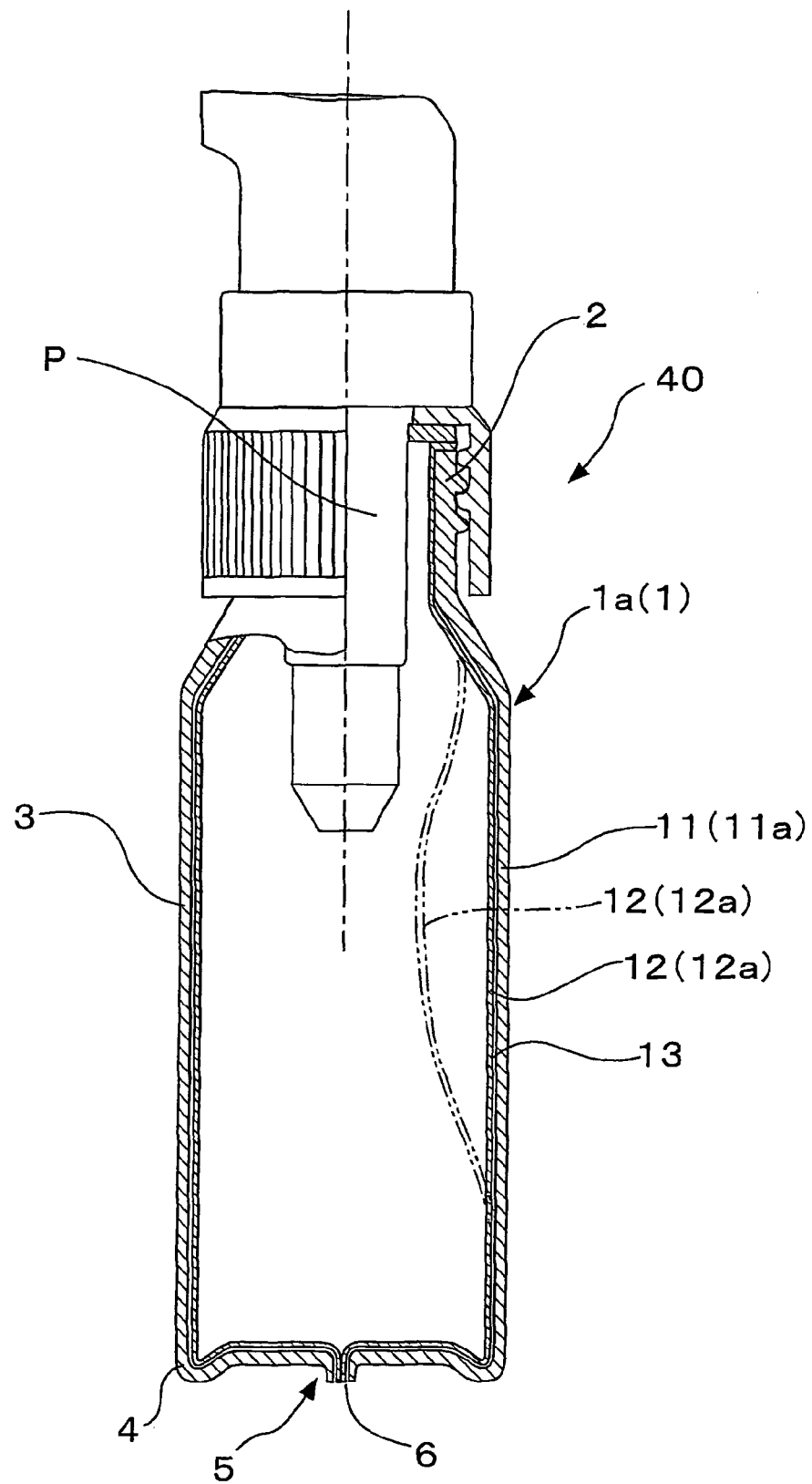
FIG. 3 is a front view, partially shown in a vertical section, of a pump-fitted container obtained by using the double container in the second embodiment of this invention.

FIG. 3 is a front view, partially shown in a vertical section, of a pump-fitted container 40 obtained by using the double container 1a in the second embodiment of this invention. The pump-fitted container 40 comprises a double container 1a and a pump P of a manually depressed type fitted firmly to the neck 2. The container 1a has construction similar to the double container of the first embodiment, but has a relatively thin inner layer 12, and this inner layer 12 forms an inner container 12a which is deformable in an inwardly deflating manner with the drop of inner pressure. Thus, the container 1a performs the function as a delaminatable bottle.

As described above for the container of the first embodiment, the container 1a is a double container having the space 13 formed between the outer layer 11 and the inner layer 12 due to the mold shrinkage, and this space 13 starts from the cracked pinch-off portion 6 in the bottom portion of the outer layer 11. Unlike conventional delaminatable bottles, the molded double container is capable of eliminating the steps of putting the inner container 12a under reduced pressure to deform the inner container 12a and to peel the inner layer 12 from the outer layer and then allowing the inner container 12a to restore the original shape again.

If the pump P is pushed down under the condition that the inner container 12a has been filled with the contents, then the contents are discharged from a front nozzle by way of a discharge passage. The inner container 12a is deformable in a deflating manner to an extent to which the contents have been dispensed (See a two-dot chain line in FIG. 3). After an amount of the contents has been discharged, the pump P is released from the pressed condition. At that time, outside air is taken into the space between the outer layer 11 and the inner layer 12 in an amount corresponding to the extent to which the inner container 12a has been deflated.

Figure 4:
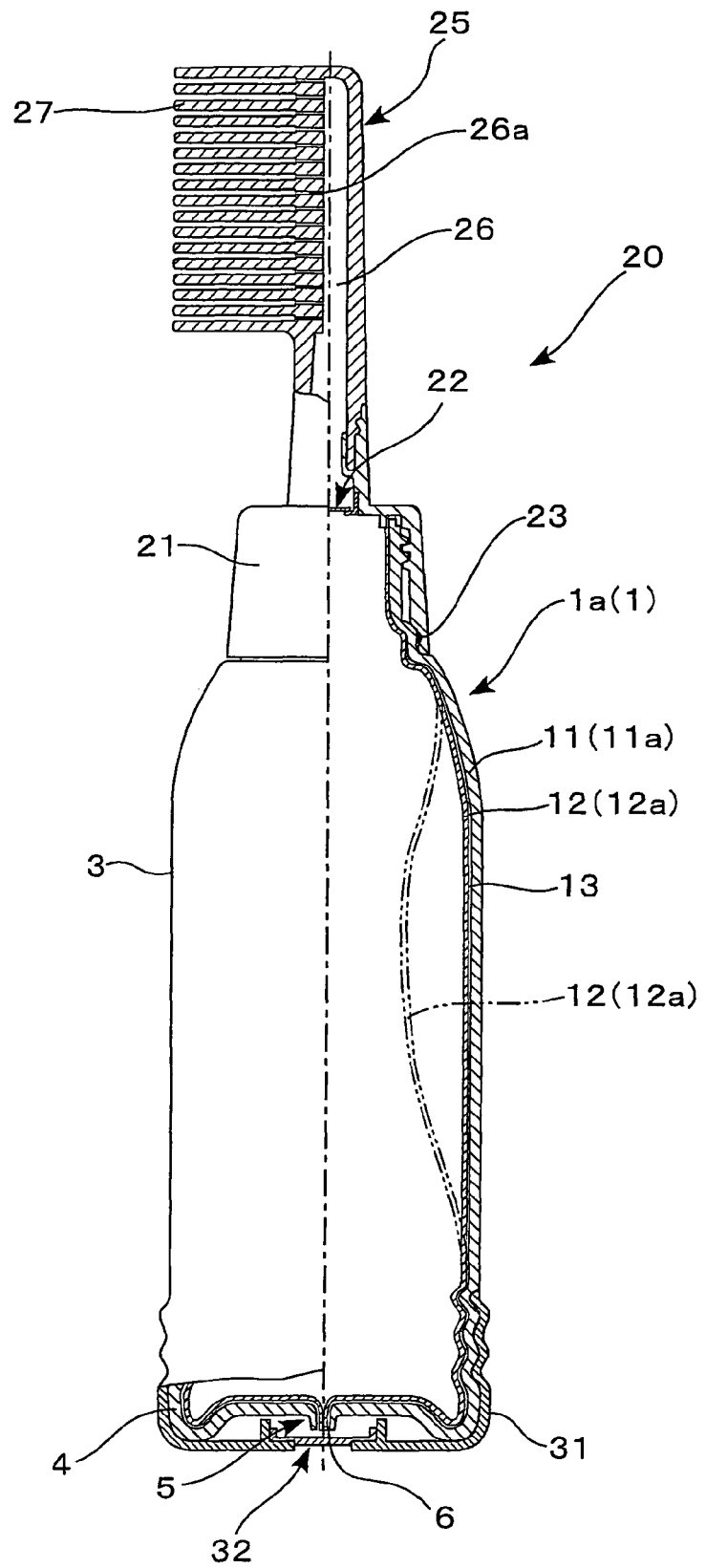
FIG. 4 is a front view, partially shown in a vertical section, of a comb-fitted container obtained by using the double container in the third embodiment of this invention.

FIG. 4 is a front view, partially shown in a vertical section, of the double container in the third embodiment of this invention, which is a comb-fitted container 20 having a comb attachment 25 fitted to the upper end of the container 1a. This container 1a has the construction roughly similar to the double container of the first embodiment. The inner container 12a is formed by a relatively thin inner layer 12 and is deformable in an inwardly deflating manner with the drop of inner pressure. This double container has the function as a delaminatable bottle of the squeezable type.

A cap 21 is tightly fitted around the neck 2 of the container 1a by utilizing an O-ring 23. The comb attachment 25 is fitted firmly to the container by way of this cap 21. A first check valve 22 is disposed on a flat roof of the cap 21.

Meanwhile, a cylindrical base cup 31 having a bottom of its own is tightly fitted around the container bottom 5. A second check valve 32 is disposed on the bottom plate of this base cup 31.

If the bottle is squeezed with a hand under the condition that the inner container 12a has been filled with the contents, there opens the first check valve 22. The contents go up the discharge flow passage 26 of the comb attachment 25, and are discharged through discharge ports 26a into a space among teeth. The inner container 12a is deformed in a deflating manner to an extent to which the contents have been dispensed (See a two-dot chain line in FIG. 4).

After an amount of the contents has been discharged, the container is released from the squeeze. The outer container 11a made of the outer layer 11 returns to its former shape due to the elastic restoring force. At that time, the second check valve 32 opens, and outside air is taken into the space between the outer layer 11 and the inner layer 12 in an amount corresponding to the extent to which the inner container 12a has been deflated.

When the body 3 is squeezed again to discharge the contents, the second check valve 32 returns to the closed position. At that time, the sealing function of the base cup 31 is activated to confine the air within the space between the outer layer 11 and the inner layer 12. Therefore, the squeezing movements can be repeated easily.

The comb-attached container 20 in the third embodiment comprises that the bottom 4 is provided with a means of taking in air through the cracked pinch-off portion 6 and is sealed with the base cup 31 having the second check valve 32. However, under different construction, the bottom seal 5 may be of a non-cracked type such as shown in FIG. 2. In that case, an air intake hole is formed in the outer layer 11 of the neck 2 to let the air in the space between the outer layer 11 and the inner layer 12. The second check valve is disposed on a peripheral wall of the cap 21 to stop air flow through this air intake hole.

This invention has been described above with respect to preferred embodiments. However, this invention should not be construed as limitative to these embodiments. In the above embodiments, the space has been described as formed over a roughly entire area of the container excluding the neck, but the space may also be formed partially by using, e.g., an adhering layer to adhere the outer layer and the inner layer partially.

If necessary, another layer or other layers can be laminated on the outer surface of the outer layer and/or on the inner surface of the inner layer. The synthetic resins can be variously combined for the outer and inner layers, taking the mold shrinkage and the adherent strength of both layers into account. In addition to the combination of a PET resin and a PP resin, there are also other usable combinations, including such combinations as PP/PE (polyethylene), PET/PE, and PEN (polyethylene naphthalate)/PE. The mold shrinkage and adherent strength of both layers can be controlled by blending a main component with another synthetic resin or by dispersing a pigment or filler in the main component.

INDUSTRIAL APPLICABILITY

The synthetic resin double container of this invention can be molded easily by an ordinary direct blow molding process, without requiring the steps of inserting the inner container into the outer container and fitting the inner container firmly to the outer container. This double container is expected to have wide applications of use as a delaminatable bottle and as a decorative container that is decorated by utilizing the double walls.

The invention claimed is:

1. A synthetic resin double container made by a direct blow molding process, said synthetic resin double container comprising:
   an inner layer made of a first synthetic resin and having a first mold shrinkage factor;
   an outer layer made of a second synthetic resin and having a second mold shrinkage factor, the first synthetic resin and the second synthetic resin being mutually non-adherent, which allows both the outer and inner layers to be left in a detached state due to a difference in mold shrinkage factors of the two layers involved in a direct blow molding step, the first mold shrinkage factor being greater than the second mold shrinkage factor; and
   a bottom seal formed in an underside surface of a bottom section of the synthetic resin double container by a pinch-off section of a split blow mold, wherein
   portions of a body and a bottom are largely deformed as a result of the direct blow molding, a peeling force caused by a first difference between the first mold shrinkage factor and the second mold shrinkage factor being greater than an adherent strength of the inner layer and the outer layer,
   portions of a neck are slightly deformed as a result of the direct blow molding, a peeling force caused by a second difference between the first mold shrinkage factor and the second mold shrinkage factor being less than an adherent strength of the inner layer and the outer layer,
   the double container has (1) a first condition, immediately after the direct blow molding step, wherein the inner layer and the outer layer are closely attached to one another by an adherent strength of the inner layer and the outer layer, and (2) a second condition, subsequent to the first condition, wherein the peeling force caused by the first difference between the first mold shrinkage factor and the second mold shrinkage factor at the body and the bottom is greater than the adherent strength of the inner layer and the outer layer and separates both layers of the inner layer and the outer layer to form a space between the inner layer and the outer layer in the body and the bottom, and wherein the inner layer and the outer layer in the neck remain adhered to one another, and
   the first synthetic resin or the second synthetic resin has a pigment or a filler dispersed therein.

2. The synthetic resin double container according to claim 1, wherein a portion of the outer layer in the bottom seal has a cracked pinch-off portion, wherein the cracked pinch-off portion in the bottom seal is formed by mold shrinkage involved in the direct blow molding process.

3. The synthetic resin double container according to claim 1, wherein the inner layer forms an inner container which is deformable in an inwardly deflating manner with a drop of inner pressure.

4. The synthetic resin double container according to claim 2, wherein the inner layer forms an inner container which is deformable in an inwardly deflating manner with a drop of inner pressure.

* * * * *